(12) United States Patent  (10) Patent No.: US 7,607,421 B2
Farrow et al.  (45) Date of Patent: Oct. 27, 2009

(54) PULSATION-DAMPENING FUEL TRIM STRATEGY FOR AIR/FUEL RATIO CONTROL OF PROPANE-FUELED, SPARK-IGNITED ENGINES

(75) Inventors: Timothy J. Farrow, Fort Collins, CO (US); Barry T. Brinks, Fort Collins, CO (US)

(73) Assignee: Woodward Governor Company, Fort Collins, CO (US)

( * ) Notice: Subject to any disclaimer, the term of this patent is extended or adjusted under 35 U.S.C. 154(b) by 380 days.

(21) Appl. No.: 11/379,458

(22) Filed: Apr. 20, 2006

(65) Prior Publication Data

US 2007/0246018 A1 Oct. 25, 2007

(51) Int. Cl.
F02B 43/00 (2006.01)
(52) U.S. Cl. ..................... 123/527; 123/446
(58) Field of Classification Search ................ 123/527, 123/402, 403, 478, 446, 529, 688, 695, 697; 137/492.5
See application file for complete search history.

(56) References Cited

U.S. PATENT DOCUMENTS

| | | | | |
|---|---|---|---|---|
| 4,489,700 A | * | 12/1984 | van der Weide | 123/527 |
| 4,864,991 A | * | 9/1989 | Snyder et al. | 123/344 |
| 4,886,034 A | * | 12/1989 | Lambert | 123/587 |
| 5,337,722 A | * | 8/1994 | Kurihara et al. | 123/527 |
| 5,755,203 A | * | 5/1998 | Mastumoto | 123/403 |
| 5,762,102 A | * | 6/1998 | Rimboym | 137/492.5 |
| 5,899,070 A | * | 5/1999 | Droessler et al. | 60/612 |
| 7,007,636 B2 | * | 3/2006 | Schlesser et al. | 122/448.1 |

* cited by examiner

Primary Examiner—Stephen K Cronin
Assistant Examiner—J. Page Hufty
(74) Attorney, Agent, or Firm—Reinhart Boerner Van Deuren P.C.

(57) ABSTRACT

A trim system for controlling an equivalence ratio in a fuel system is provided. The fuel system includes an air duct, a mixer disposed in the air duct, and a converter. The mixer has a reference pressure port and an air valve vacuum port. The converter has an outlet port and a bias port. The trim system comprises the mixer, the converter, a balance line, one or more orifices, and first and second trim valves. The outlet port is operably coupled to the mixer to deliver vaporized fuel to the mixer. The balance line is operably coupled to the reference pressure port, the bias port, and the air valve vacuum port. The balance line provides pressure to the bias port. The first and second trim valves are disposed in the balance line and operable such that the equivalence ratio in the fuel system is controlled.

20 Claims, 2 Drawing Sheets

PULSATION-DAMPENING FUEL TRIM STRATEGY FOR AIR/FUEL RATIO CONTROL OF PROPANE-FUELED, SPARK-IGNITED ENGINES

FIELD OF THE INVENTION

This invention generally relates to fuel systems and, more particularly, to a trim system for a propane fuel system.

BACKGROUND OF THE INVENTION

A spark-ignited internal-combustion engine generally operates by combusting a fuel in the presence of an oxidizer such as air. If the internal-combustion engine is to operate efficiently, the equivalence ratio must be effectively controlled. The equivalence ratio is a term used to collectively represent the fuel to air ratio, which is denoted by the Greek letter phi ($\phi$), and the air to fuel ratio, which is denoted by Greek letter lambda ($\lambda$) and is the inverse of phi.

Some engine systems employ a trim system to accomplish the task of controlling the equivalence ratio. The trim system operates in conjunction with a fuel system and an equivalence ratio feedback system to maintain a desirable equivalence ratio. Preferably for systems utilizing a 3-way catalyst, the trim system in conjunction with the feedback system is able to keep the equivalence ratio at or near stoichiometry. Stoichiometry is the point at which the most complete combustion takes place in the internal-combustion engine. Operating at stoichiometric conditions results in the highest three-way catalyst efficiency which equates to the lowest overall emissions out of the catalyst.

While many trim systems are known in the art, many existing systems have problems. For example, some trim systems produce undesirable pressure pulsations during operation. In extreme cases, the pressure pulsations cause noticeable variations in the equivalence ratio. Unintended variations in the equivalence ratio also increase emissions. The pressure pulsations can negatively affect components in the fuel system. The pressure pulsations can excite a converter (i.e., regulator, vaporizer) in the fuel system such that internal components of the converter are subject to premature wear. As a result, the converter and other components have to be replaced more often than expected. Replacing worn components is time consuming, costly and may not be allowed without penalties from governing bodies.

Additionally, some trim systems employ only a single solenoid trim valve to regulate the equivalence ratio. In such systems, there is no redundancy built into the trim system. If the lone solenoid trim valve fails, the trim system is no longer able to control the equivalence ratio. As a result, the performance of the internal-combustion engine suffers dramatically.

Further, known trim systems are not designed to handle a loss of trim system power and still maintain the equivalence ratio at or near stoichiometry. Should a loss of power occur, the fuel to air mixture is uncontrolled and, in most cases, becomes either very rich or very lean. The end result is that the internal-combustion engine operates poorly and emissions from the engine are increased when trim system power is lost.

From the foregoing, it can be seen that existing trim systems have problems associated with them.

BRIEF SUMMARY OF THE INVENTION

The invention provides a trim system that can mitigate or substantially reduce pressure pulsations due to operation, resist premature wear, provide redundancy, operate at or near stoichiometry upon a loss of power, and efficiently and effectively control an equivalence ratio. Advantages of the invention, as well as additional inventive features, will be apparent from the description of the invention provided herein.

In one aspect, the invention provides a trim system for controlling an equivalence ratio of a fuel system. The fuel system includes an air duct, a mixer disposed in the air duct, and a converter. The mixer has a reference pressure port upstream of the mixer and an air valve vacuum port downstream of the mixer. The reference pressure port and the air valve vacuum port are located within the mixer or the air duct. The converter has an outlet port and a bias port. The outlet port is operably coupled to the mixer to deliver vaporized fuel to the mixer. The trim system comprises a balance line and first and second trim valves. The balance line is operably coupled to the reference pressure port, the bias port, and the air valve vacuum port. The balance line provides pressure to the bias port. The first and second trim valves are disposed in the balance line. The first and second trim valves are operable such that the equivalence ratio in the fuel system is controlled.

In another aspect, the invention provides a trim system for controlling an equivalence ratio of a fuel system and mitigating pressure pulsations in the fuel system. The fuel system includes an air duct. The trim system comprises a mixer, a converter, a balance line, first and second trim valves, and an electronic control module. The mixer is disposed in the air duct and has a reference pressure port upstream of the mixer and an air valve vacuum port downstream of the mixer. The converter has an outlet port and a bias port. The outlet port is operably coupled to the mixer to deliver vaporized fuel to the mixer. The balance line is operably coupled to the reference pressure port, the bias port, and the air valve vacuum port. The balance line provides pressure to the bias port. The first and second trim valves are disposed in the balance line. The electronic control module is operably coupled to the first and second trim valves. The electronic control module controls operation of the first and second trim valves such that the equivalence ratio is controlled and the pressure pulsations are mitigated.

In yet another aspect, the invention provides a trim system for controlling an equivalence ratio for a spark-ignited internal-combustion engine. The trim system comprises an air duct, a mixer, a converter, a balance line, an orifice, first and second trim valves, and an electronic control module. The air duct extends between an air cleaner and the spark-ignited internal-combustion engine. The mixer is disposed in the air duct. The mixer has a reference pressure port upstream of the mixer and an air valve vacuum port downstream of the mixer. The converter has an outlet port and a bias port. The outlet port is operably coupled to the mixer to deliver vaporized fuel to the mixer. The balance line is operably coupled to the reference pressure port, bias port, and the air valve vacuum port. The balance line provides pressure to the bias port. The orifice and the first and second trim valves are disposed in the balance line. The electronic control module is operably coupled to the first and second trim valves. The electronic control module controls the operation of the first and second valves such that the equivalence ratio of the spark-ignited internal-combustion engine is controlled.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The invention provides a trim system that mitigates pressure pulsations due to operation, resists premature wear, provides redundancy, operates at or near stoichiometry upon loss of power, and efficiently and effectively controls an equivalence ratio.

Figure 1:
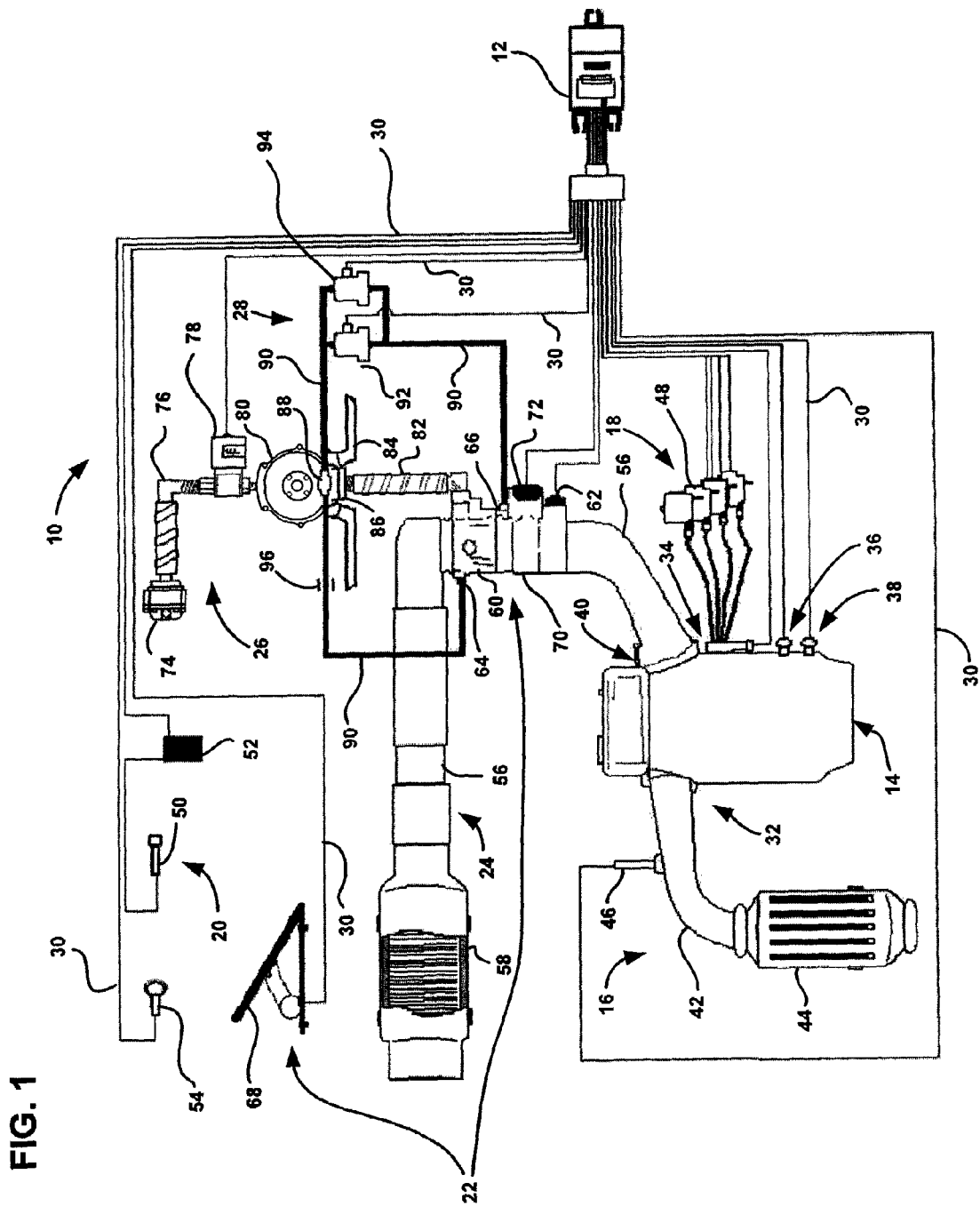
FIG. 1 is a simplified schematic view of an exemplary embodiment of a trim system incorporated in an engine system, operated in parallel, and constructed in accordance with the teachings of the present invention.

Referring to FIG. 1, an engine system 10 is shown. The engine system 10 comprises an electronic control module (ECM) 12, a spark-ignited internal-combustion engine 14, an exhaust system 16, a spark-producing system 18, an ignition system 20, a throttle system 22, an air intake system 24, a fuel system 26, and a trim system 28.

As will be explained more fully below, the ECM 12 generally monitors, controls, and otherwise manages the operation of the engine system 10. As will be more fully explained below, the ECM 12 is operably coupled, via wiring 30 or otherwise, to the above-noted systems 16-28. Preferably, the ECM 12 has full authority over spark, fuel, and air in the engine system 10. In one embodiment, the ECM 12 is one of the electronic control modules commercially available from Woodward Governor Company of Fort Collins, Colo. If desired, more than one ECM 12 can be utilized by the engine system 10.

The engine 10 operates using a vaporized liquid propane gas (LPG), natural gas, or other fuel. The engine 10 is particularly suited for an alternative-fueled off-highway vehicle. The engine 10 includes, among other things, an exhaust port 32, a spark coupling 34, an oil pressure switch 36, a coolant temperature sensor 38, and an air intake port 40.

The exhaust port 32 is generally coupled to the exhaust system 16. The exhaust system 16 comprises an exhaust pipe 42, a muffler 44 (including a catalyst), and an oxygen sensor 46. Note that the catalyst may be a separate component. The exhaust pipe 42 generally extends between the exhaust port 32 and the muffler 44 such that emissions and the by-products of combustion are routed away from the engine 14. The oxygen sensor 46 is disposed within the exhaust pipe 42 to sense a level of oxygen in the exhaust gases passing through the exhaust pipe, and thus can measure the equivalence ratio. The oxygen sensor 46 is operably coupled to and monitored by the ECM 12. The muffler 44 is employed to muffle the sound leaving the engine 14 and/or to reduce the level of contaminants in the emissions leaving the engine. The muffler 44 is preferably one of a catalytic muffler, a three-way catalyst muffler, and the like.

The spark coupling 34 is generally coupled to the spark-producing system 18. The spark-producing system 18 comprises a smart coil 48. The smart coil 48 is configured to generate a spark within the engine 14 to combust the fuel found therein. The smart coil 48 has built-in driver circuitry to eliminate the need for a driver circuit inside the ECM 12 or otherwise outside of the smart coil. The smart coil 48 is operably coupled to and monitored by the ECM 12. Although a smart coil 48 is illustrated in FIG. 1, other coil systems can be employed.

The oil pressure switch 36 is generally disposed in a lower portion of the engine 14 and monitors the oil pressure within the engine. The coolant temperature sensor 38 monitors the temperature of the coolant flowing in and/or around the engine. Both the oil pressure switch 36 and the coolant temperature sensor 38 are operably coupled to and monitored by the ECM 12.

The ignition system 20 comprises a key switch 50, a power relay 52, and a fault light 54. The key switch 50 controls the activation and deactivation of the engine system 10. Using a key that has been correctly keyed and placed within the key switch 50, the key switch is moveable to a variety of positions pertaining to the operation of the engine system 10 and engine 14. For example, the key switch 50 can be switch into an "on" or "run" position, an "accessory" position, and an "off" or "lock" position.

The power relay 52 is used, for example, to provide power to the ECM when the key switch 50 has been placed in the "on" position. The fault light 54 is an indicator used to warn or alert an operator about conditions related to the engine system 10 such as, for example, that the engine 14 is running or stopped, that the equivalence ratio is undesirable, that one or more components of the engine system 10 are not operating properly or have failed, and the like. Each of the key switch 50, power relay 52, and fault light 54 are operably coupled to and monitored by the ECM 12.

The air intake port 40 (or plurality of ports) is operably coupled to the air intake system 24. The air intake system 24 includes an air duct 56, an air cleaner 58, a mixer 60, and a temperature/manifold absolute pressure (TMAP) sensor 62. The air duct 56, or air intake manifold, generally extends between the air intake port 40 and the air cleaner 58 such that a source of air is provided to the engine 14. The air duct 56 is able to carry air from the air cleaner 58, through the mixer 60, and to the air intake port 40 of the engine 14. Various other components (e.g., adapters, etc.) can be included and operably couple together the specifically referenced components. For example, there can be an adapter that plumbs the mixer to the throttle and another adapter the plumbs the throttle to the intake manifold. Other arrangements and mountings of the components are possible without detracting from the spirit of the invention.

The air cleaner 58 (i.e., air filter) removes contaminants and particles such as, for example, dust, debris, and the like, from the air. The air cleaner 58 is formed from paper, cotton, foam, synthetic materials, and the like.

The mixer 60 is disposed and/or incorporated into the air duct 56. The mixer 60 mixes, blends, and/or combines the air and the fuel. In one embodiment, the mixer 60 can be a venturi mixer, a variable venturi mixer, an air-valve mixer, and the like. The mixer 60 includes a reference pressure port 64 and an air valve vacuum port 66 that each pass into the air duct 56 and are exposed to the air therein. The reference pressure port 64 and the air valve vacuum port 66 may be integrally formed with the mixer 60 or mounted separately within the air duct 56 proximate the mixer. In the illustrated embodiment of FIG. 1, the reference pressure port 64 is disposed upstream of the mixer 60 (e.g., upstream of an air valve in the mixer) while the air valve vacuum port 66 is disposed downstream of the mixer (e.g., downstream of the air valve in the mixer). As such, the reference pressure port 64 and the air valve vacuum port 66 experience different pressures.

The TMAP sensor 62 is a sensing device that fits directly into the air duct 56 or is otherwise incorporated into the engine system such as in an intake manifold. As shown in FIG. 1, the TMAP sensor 62 is disposed downstream of the mixer 60 and the throttle 70. The TMAP sensor 62 includes a temperature sensor and a pressure transducer. As such, the TMAP sensor 62 is able to accurately measure temperatures and pressures. In one embodiment, the TMAP sensor 62 senses one or more of the vacuum draw from the engine 14, a vacuum in the air duct 56, and/or a barometric pressure depending on whether the key switch 50 is in the "on" position and whether the engine 14 is running or not. For example, the TMAP sensor 62 measures the pressure and temperature of the media proximate the air intake port. If the engine 14 is running and the application is normally aspirated, the pressure the TMAP sensor measures will be below atmospheric pressure. If, on the other hand, the application is turbocharged, the pressure the TMAP sensor 62 measures could be above or below atmospheric pressure depending on the boost level, throttle position, engine speed, and the like. The TMAP sensor 62 is operably coupled to and monitored by the ECM 12.

The throttle system 22 includes a foot pedal 68, a throttle 70, and a throttle position sensor (TPS) 72. The foot pedal 68 permits a user of a vehicle to control the position of the throttle 70. The throttle 70 is disposed within the air duct 56 downstream of the mixer 60 and is, in general, a type of valve used to control the flow of an air/fuel mixture into the engine 14. In one embodiment, the throttle 70 is a drive-by-wire throttle. Using the foot pedal 68 to control the throttle 70, the amount of fuel being delivered to the engine 14 is regulated to match the throttle position. As a result, the speed of the vehicle or the work output of the engine can be increased, decreased, or maintained.

The TPS 72 senses the position of the throttle 70. In one embodiment, the TPS 72 includes a linear variable resistor that produces a particular linear voltage relative to the position of the throttle 70. For example, when the engine 14 is at idle, the TPS 72 generates about 0.5 volts and when the throttle 70 is fully open and the engine is running at its maximum the TPS produces about four and a half (4.5) volts. Each of the foot pedal 68, the throttle 70, and the TPS 72 are operably coupled to and monitored by the ECM 12.

The fuel system 26 is operably coupled to a fuel source (e.g., a fuel tank) and includes a fuel filter 74, a fuel line 76, a fuel lock 78, a converter 80, a fuel delivery line 82, and a coolant line 84. The fuel filter 74 is a device used to remove contaminants, debris, and/or particles from the fuel supplied by the fuel source. The fuel filter 74 is coupled to the fuel lock 78 by the fuel line 76. Because the fuel lock 78 is a normally-closed device, when unpowered the fuel lock 78 restricts or prevents the further delivery of fuel and is often vacuum or solenoid actuated. When powered, the fuel lock 78 is a passive device and permits the free flow of fuel. The fuel lock 78 is configured to terminate the supply of fuel to the engine system 10 when an emergency situation arises, when the engine fails, when the key switch 50 is in the "off" position, and the like, and is considered to be a safety device. The fuel lock 78 is operably coupled to and monitored by the ECM 12.

The converter 80, which is a combination of a pressure regulator and vaporizer/heat exchanger, converts a liquid fuel such as, for example, liquid propane to either a gaseous fuel or a mixture of liquid and gaseous fuel and then regulates the pressure of the fuel. In other words, the converter 80 vaporizes the liquid fuel and regulates the pressure of the fuel. The converter 80 includes an outlet port 86 and a bias port 88. The outlet port 86 is operably coupled by the fuel delivery line 82 to the mixer 60. As such, the vaporized fuel is able to flow from the converter 80 into the mixer 60.

The converter 80 typically uses the heat generated from the engine 14 to assist in the process of vaporizing the fuel. As shown in FIG. 1, the coolant line 84 carries a coolant that has absorbed some of the heat generated by the engine 14. The heated coolant is flowed inside or proximate the converter 80 and the heat from the coolant aids in the vaporization of the fuel. It should be noted that the coolant line 84 is not shown connected to anything other than the converter 80. It is illustrated this way for clarity and need not be shown in further detail as those skilled in the art will recognize how the coolant line 84 is routed.

Liquid fuel such as propane enters the converter 80 and then is vaporized by heat from the engine coolant via coolant line 84 and a pressure drop across a pressure regulator within the converter 80. Heat is transferred to the fuel by the coolant heated passages within the converter 80. A regulator within the converter 80 controls the converter 80 fuel pressure by metering the fuel flow into the converter 80. The pressure at the bias port 88 alters the amount of fuel that flows into the mixer 60. When engine demand draws fuel from the low-pressure side, the regulator opens, letting liquid fuel into the chamber, continuing the vaporization process. In one embodiment, the converter 80 comprises two single stage regulators with a heat exchanger in between. The second stage regulator within the converter is biased by the pressure at the bias port 88 and determines the amount of fuel flowing into the mixer 60. In another embodiment, the system comprises a heat exchanger with one or more separate pressure regulators.

Still referring to FIG. 1, the trim system 28 comprises a balance line 90, a first trim valve 92, and a second trim valve 94 operably coupled to and operating in conjunction with the mixer 60 and the converter 80. The balance line 90 is configured to permit the flow of air therethrough and to carry air to and from the air duct 56. In particular, the balance line 90 permits air to flow from the upstream side of the mixer 60 (e.g., upstream of the air valve in the mixer), through the trim system 28, then to the downstream side of the mixer (e.g., downstream of the air valve in the mixer). The reference pressure port 64, the bias port 88, and the air valve vacuum port 66 are each operably coupled to the balance line 90. The balance line 90 provides fluid (e.g., air) communication between the reference pressure port 64, the bias port 88, and the air vacuum valve port 66. In one embodiment, the balance line 90 includes an orifice 96 to partially restrict the flow of air. The trim valves 92, 94 can also be resized by installing additional orifices (e.g., 96) upstream or downstream of each trim valve.

The first and second trim valves 92, 94 are disposed in the balance line 90 and in fluid communication with the reference pressure port 64, the bias port 88, and the air vacuum valve port 66. The first and second trim valves 92, 94, in conjunction with the orifice 96, are operable to adjust the pressure at the bias port 88 and thereby control a flow, mass, and/or volume of fuel flowing through the fuel delivery line 82. As such, the first and second trim valves 92, 94 are able to control and/or manage the equivalence ratio (i.e., either phi (φ) or lambda (λ)) of the engine system 10 relative to a control signal from the ECM 12.

For example, if the trim valves 92, 94 permit too much fuel to flow through the fuel delivery line 82, the air/fuel ratio becomes too rich. On the other hand, if the trim valves 92, 94 permit too little fuel to pass, the air/fuel ratio becomes too be lean. Either of these circumstances results in the engine 14 operating poorly and/or inefficiently. However, if the trim valves 92, 94 allow the proper amount of fuel to pass, stoichiometry is achieved (i.e., lambda approaches one) and the engine 14 runs smoothly, efficiently, and with minimal emissions.

It has been recognized that stoichiometry occurs when, for example, the fuel to air ratio is: about fifteen and five tenths pounds (15.5 lbs) of air to about one pound (1 lb) of propane, about fourteen and seven tenths pounds (14.7 lbs) of air to about one pound (1 lb) of gasoline, and about fourteen and five tenths pounds (14.5 lbs) of air to about one pound (1 lb) of diesel.

In one embodiment, each of the first and second trim valves 92, 94 is a pulse width modulated valve. Like many of the other components in the engine system 10, the first and second trim valves 92, 94 are operably coupled to and monitored by the ECM 12. The operation of the first and second trim valves 92, 94 may be controlled by the ECM 12.

In FIG. 1, the first trim valve 92 and the second trim valve 94 are each disposed in the balance line 90 downstream of the converter 80. As illustrated, the first and second trim valves 92, 94 are positioned to be in parallel with each other. In one embodiment, the first and second trim valves 92, 94 are normally closed solenoid valves and the orifice 96 is disposed in the balance line 90 upstream of the converter 80. Therefore, the orifice 96 effectively restricts the flow so that the first and second trim valves 92, 94 are able to change the pressure at the bias port 88. When the trim valves 92, 94 are off, the pressure at the bias port 88 is the same as the pressure at the reference pressure port 64. In contrast, when the trim valves 92, 94 are on, the pressure at the bias port 88 approaches the pressure at the air valve vacuum port 66. Duty cycling the trim valves 92, 94 enables the pressure at the regulator bias port to be be controlled at or in between the two pressure extremes.

As a result of this duty cycling, the first and second trim valves 92, 94, when oriented as shown in FIG. 1, are able to manipulate the pressure at the bias port 88 between a pressure at the reference pressure port 64 and a pressure at the air valve vacuum port 66. As such, the equivalence ratio (i.e., the air/fuel ratio) is controllable, adjustable, and the like. Since the equivalence ratio can be controlled, stoichiometry can be achieved and the most efficient and best combustion realized, resulting in good fuel efficiency and low emissions.

The first and second trim valves 92, 94 are generally operated sequentially (i.e., one at a time) to eliminate, cancel out, and/or substantially reduce the pressure pulsations generated from the on/off cycling of the valves. By eliminating or lessening the pressure pulsations, undesirable wear on the regulator 80, as well as other components of the engine system 10, can be prevented or diminished. Further, the reduced (and/or eliminated) pressure pulsations are unable to negatively affect the equivalence ratio and post catalyst emissions. Additionally, the frequency at which the trim valves 92, 94 are operated is also varied as a function of engine 14 speed. The frequency is varied in order to avoid resonance conditions between the trim and fuel systems 26, 28 and the pressure pulsations with the air intake system 24 generated by the opening, closing, and/or timing of engine intake valves.

In one embodiment, the first trim valve 92 in the trim system 28 of FIG. 1 is a normally closed trim valve while the second trim valve 94 is a normally open trim valve. Therefore, should power to the engine system 10, and in particular the first and second trim valves 92, 94 and/or the ECM 12 be interrupted or lost, the second valve 94 will remain open as the first valve 92 shuts. If the first and second trim valves 92, 94 and the orifice 96, along with the rest of the engine system 10, are configured appropriately, having just one trim valve open will result in operation at or near stoichiometry. In such an embodiment, the first and second trim valves 92, 94 generally operate synchronously (i.e., at about the same time) such that as one valve opens, the other valve closes. This method of operation ensures that the pressure pulsations generated by the operation of the trim valves 92, 94 are effectively cancelled out or reduced, and that the system fails to an operating condition of stoichiometry.

Figure 2:
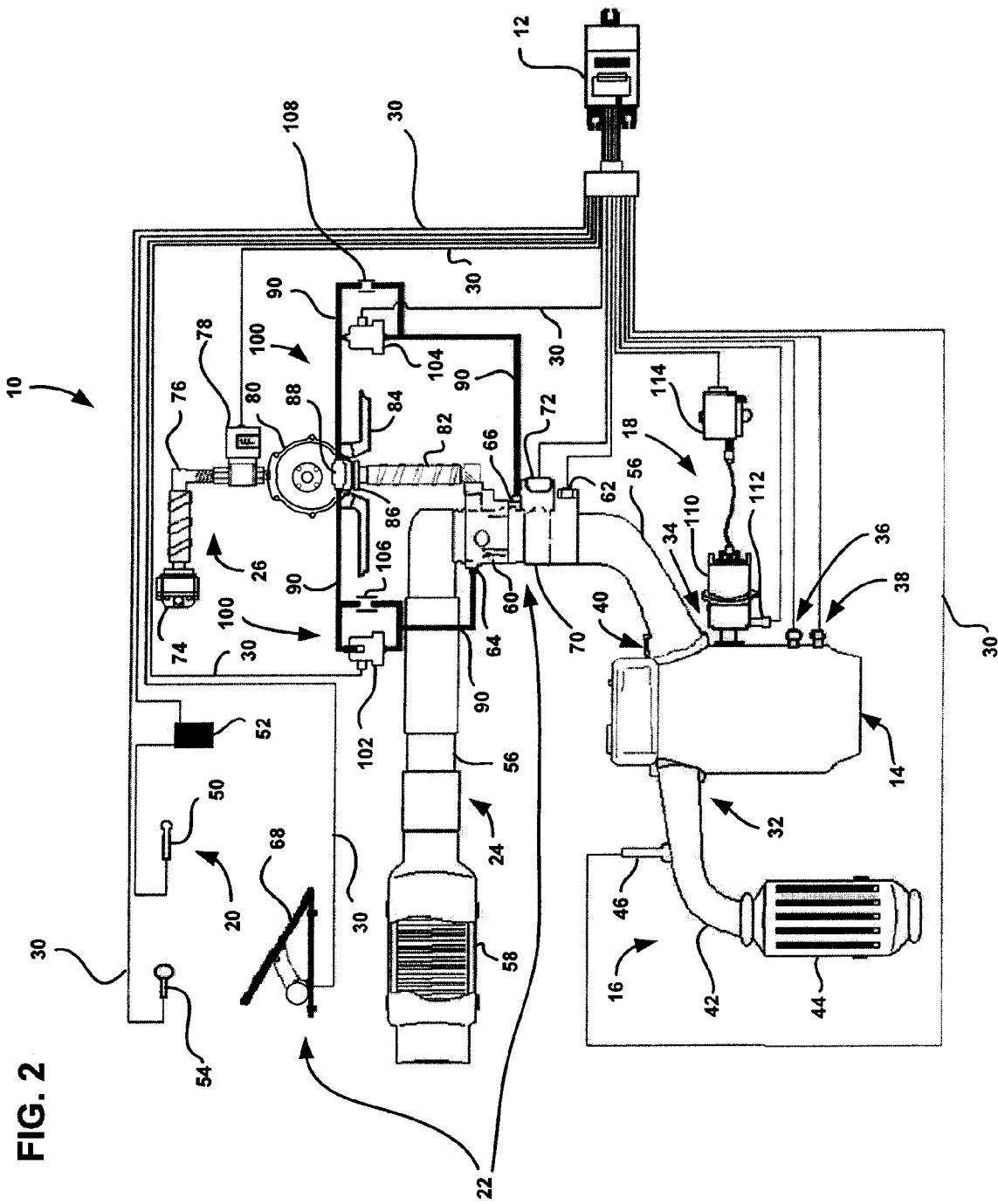
FIG. 2 is a simplified schematic view of an exemplary embodiment of the trim system of FIG. 1 incorporated in an engine system, operated in series, and constructed in accordance with the teachings of the present invention.

Referring now to FIG. 2, another embodiment of the trim system of the invention is illustrated within the engine system 10. As shown, the trim system 100 includes a first trim valve 102 and a second trim valve 104 in series with each other. The first trim valve 102 is positioned upstream of the bias port 88 while the second trim valve 104 is positioned downstream of the bias port 88. A first orifice 106 is placed in parallel with the first trim valve 102 and a second orifice 108 is placed in parallel with the second trim valve 104. As before, each of these orifices 102, 104 act to restrict the flow of fluid and/or resize flow areas. When the first trim valve 102 is closed, the flow of air must pass through the first orifice 106. Likewise, when the second trim valve 104 is closed, the flow of air must pass through the second orifice 108. As before, the first and second trim valves 102, 104 are monitored and operated by the ECM 12.

In one embodiment, each of the first and second trim valves 102, 104 in FIG. 2 is a normally closed, pulse width modulated solenoid valve. The first and second trim valves 102, 104 are much like, and operate quite similarly to, the first and second trim valves 92, 94 of FIG. 1. When positioned within the engine system 10 as shown in FIG. 2, the first and second trim valves 102, 104 are generally operated synchronously (i.e., in phase with each other). In other words, each time the first trim valve 102 opens for a period of time, the second trim valve 104 opens at the same time for that same period of time, and vice versa. Likewise, each time the first trim valve 102 is closed for a period of time, the second trim valve 104 is closed at the same time for that same period of time, and vice versa.

As also depicted in FIG. 2, in one embodiment, the engine system 10 employs a spark producing system 18 that comprises a distributor 110, a variable reluctance sensor 112, and a smart coil 114. The distributor 110, variable reluctance sensor 112, and smart coil 114 operate in conjunction with each other to provide spark somewhat like the lone smart coil 48 of FIG. 1. Either type of spark-producing system 18 may be used with the invention.

In operation, and referring to both FIGS. 1 and 2 unless otherwise noted, after the ignition system 20 is used to activate the engine system 10, air is drawn through the air cleaner 58 and flows through the air duct 56 to the mixer 60. Simultaneously, fuel (e.g., liquid propane) is introduced into the converter 80, vaporized, and then routed into the mixer 60 via the fuel delivery line 82.

The trim valves 92, 94, 102, 104 are operated to change the pressure at the bias port 88 to adjust the amount and/or volume of the vaporized fuel provided to the mixer 60. In FIG. 1, the trim valves 92, 94 are pulse width modulated consecutively. For example, assume for the purpose of illustration that the first and second trim valves 92, 94 are run at an idle speed frequency of ten hertz (10 Hz), which translates to one hundred milliseconds (100 ms). Because the first and second trim valves 92, 94 are operated one after another, the first trim valve 92 functions during the first fifty milliseconds (50 ms) of the total one hundred millisecond time period and the second trim valve 94 functions during the second fifty milliseconds (50 ms).

During the first fifty milliseconds, only the first trim valve 92 operates. At a twenty-five percent (25%) duty cycle, the first valve is "on" and permits a flow of air for the first twelve and one half milliseconds seconds (12.5 ms) of the first fifty millisecond period. Thereafter, for the final thirty-seven and one half milliseconds (37.5 ms) the first trim valve 92 is "off". During the entire first fifty milliseconds, the second trim valve 94 is "off."

During the second fifty milliseconds, which consecutively follows the first fifty milliseconds, only the second trim valve 94 operates. Still running at the twenty-five percent (25%) duty cycle, the second trim valve 94 is "on" and permits a flow of air for the first twelve and one half milliseconds seconds of the second fifty millisecond (50 ms) period. Thereafter, for the final thirty-seven and one half milliseconds (37.5 ms) the second trim valve 94 is "off." During the entire second fifty milliseconds, the first trim valve 92 is "off." Of course, other frequencies and various duty cycles can be employed to generated the desired results. It is also possible to have the two valves operate at the same frequency, but at independent duty cycles to achieve the desired results.

From the above example, those skilled in the art will recognize that by consecutively pulse width modulating the first and second trim valves 92, 94, pressure pulsations in the balance line 90 are cancelled out or reduced, transient pressure spikes in the balance line 90 are mitigated, the resolution of the trim system is increased, the pressure at the bias port 88 is able to be manipulated as desired, and the equivalence ratio is adjustable.

In FIG. 2, the trim valves 102, 104 are pulse width modulated synchronously. Using the same operating parameters from the above example for the purposes of illustration, if the first trim valve 102 opens for twelve and a half milliseconds at idle speed, then the second trim valve 104 also opens for twelve and a half milliseconds. In other words, the first and second trim valves 102, 104 open at the same time and for the same amount of time. Likewise, if the first trim valve 102 is closed for thirty-seven and a half milliseconds at idle speed, then the second trim valve 104 is also closed for thirty-seven and a half milliseconds. The first and second trim valves 102, 104 are also closed at the same time and for the same amount of time. Those skilled in the art will recognize that the first and second trim valves 102, 104 can be pulse width modulated synchronously in order to manipulate the pressure at the bias port 88, adjust the equivalence ratio, and mitigate pressure pulsations. It is also possible to have the two valves operate at the same frequency, but at independent duty cycles to achieve the desired results.

In one embodiment, when each of the normally closed trim valves 102, 104 is off, the first and second orifices 106, 108 are sized such that the resulting bias pressure at the bias port 88 of the converter 80 results in stoichiometry. With the first trim valve 102 on and the second trim valve 104 off, the pressure at the bias port 88 is at or near (i.e., equivalent to) the pressure at the reference pressure port 64. In contrast, with the second trim valve 104 on and the first trim valve 102 off, the pressure at the bias port 88 is at or near the pressure at the air valve vacuum port 66. Again, those skilled in the art will recognize that the first and second trim valves 102, 104 can be pulse width modulated consecutively in order to manipulate the pressure at the bias port 88, adjust the equivalence ratio, and mitigate pressure pulsations.

Since the first and second trim valves 92, 94, 102, 104 are able to adjust the equivalence ratio such that it is at or near stoichiometry, the engine 14 receives an optimal mix of air and fuel, combusts the fuel using the spark-producing system 18, and produces work. The emissions generated by the engine 14 during combustion are vented into the exhaust pipe 42 and are then significantly neutralized by the catalyst 44.

From the foregoing, it can be seen that the invention provides a trim system for a spark-ignited internal-combustion engine that can mitigate pressure pulsations due to operation, provide increased trim resolution, resist premature wear, provide redundancy, operate at or near stoichiometry upon a loss of power, and efficiently and effectively control an equivalence ratio. Without the trim system, production engine, component and system variation along with operating conditions cause the engine to not operate at stoichiometry without continuous adjustment. Also, these sources of variation change over time which adds additional variation to the air/fuel ratio. The trim system described above effectively negates this variation and allows the system to run at stoichiometry over the life of the application.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A trim system for controlling an equivalence ratio in a fuel system, the fuel system including an air duct, a mixer disposed in the air duct, the mixer having a pressure port and an air valve vacuum port, and a converter having an outlet port and a bias port, the outlet port operably coupled to the mixer to deliver vaporized fuel to the mixer, the trim system comprising:
- a balance line operably coupled to the pressure port, the bias port, and the air valve vacuum port, the balance line providing pressure to the bias port; and
- first and second trim valves disposed in the balance line, the first and second trim valves operable such that the equivalence ratio in the fuel system is controlled.

2. The trim system of claim 1 wherein the first and second trim valves are in parallel.

3. The trim system of claim 2 wherein the first and second trim valves are at least one of sequentially and consecutively operable.

4. The trim system of claim 3 wherein an orifice is disposed in the balance line upstream of the converter and in series with the first and second trim valves.

5. The trim system of claim 1 wherein the first and second trim valves are in series.

6. The trim system of claim 5 wherein the first trim valve is disposed upstream of the converter and the second trim valve is disposed downstream of the converter.

7. The trim system of claim 6 wherein the first and second trim valves are synchronously operable.

8. The trim system of claim 7 wherein a first orifice is disposed in the balance line in parallel with the first trim valve and a second orifice is disposed in the balance line in parallel with the second trim valve.

9. The trim system of claim 1 wherein the first and second valves are pulse width modulated valves.

10. The trim system of claim 1 wherein the first and second trim valves are normally closed solenoid valves.

11. The trim system of claim 1 wherein the first and second trim valves are operable to mitigate pressure pulsations in the balance line.

12. The trim system of claim 1 wherein the vaporized fuel is propane.

13. The trim system of claim 1 wherein the first and second trim valves permit the pressure at the bias port to be manipulated between an upstream pressure at the pressure port and a downstream pressure at the air valve vacuum port.

14. The trim system of claim 1 wherein the first trim valve is normally open and the second trim valve is normally closed such that a loss of power results in the fuel system operating at approximately stoichiometry.

15. A trim system for controlling an equivalence ratio of a fuel system and mitigating pressure pulsations in the fuel system, the fuel system including an air duct, the trim system comprising:
- a mixer disposed in the air duct, the mixer having a pressure port and an air valve vacuum port;
- a converter having an outlet port and a bias port, the outlet port operably coupled to the mixer to deliver vaporized fuel to the mixer;
- a balance line operably coupled to the pressure port, the bias port, and the air valve vacuum port, the balance line providing pressure to the bias port;
- first and second trim valves disposed in the balance line; and
- an electronic control module operably coupled to the first and second trim valves, the electronic control module controlling operation of the first and second trim valves such that the equivalence ratio is controlled and the pressure pulsations are mitigated.

16. The trim system of claim 15 wherein the first and second trim valves are pulse width modulated valves, the first and second trim valves being in parallel and sequentially operated by the electronic control module or in series and synchronously operated by the electronic control module.

17. The trim system of claim 16 wherein the electronic control module controls operation of the first and second trim valves such that the pressure at the bias port is adjustable between a first pressure at the pressure port and a second pressure at the air valve vacuum port.

18. The trim system of claim 15 wherein the mixer is a venturi mixer.

19. A trim system for controlling an equivalence ratio for a spark-ignited internal-combustion engine comprising:
- an air duct extending between an air cleaner and the spark-ignited internal-combustion engine;
- a mixer disposed in the air duct, the mixer having a pressure port and an air valve vacuum port;
- a converter having an outlet port and a bias port, the outlet port operably coupled to the mixer to deliver vaporized fuel to the mixer;
- a balance line operably coupled to the pressure port, bias port, and the air valve vacuum port, the balance line providing pressure to the bias port;
- at least one orifice disposed in the balance line;
- first and second trim valves disposed in the balance line; and
- an electronic control module operably coupled to the first and second trim valves, the electronic control module controlling the operation of the first and second valves such that the equivalence ratio of the spark-ignited internal-combustion engine is controlled.

20. The trim system of claim 19 wherein the first and second trim valves are pulse width modulated valves, the first and second trim valves being in parallel and sequentially operated by the electronic control module or in series and synchronously operated by the electronic control module, the electronic control module controlling operation of the first and second trim valves such that the pressure at the bias port is adjustable between a first pressure at the pressure port and a second pressure at the air valve vacuum port.

* * * * *

UNITED STATES PATENT AND TRADEMARK OFFICE
CERTIFICATE OF CORRECTION

PATENT NO. : 7,607,421 B2
APPLICATION NO. : 11/379458
DATED : October 27, 2009
INVENTOR(S) : Farrow et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 565 days.

Signed and Sealed this

Twelfth Day of October, 2010

David J. Kappos
*Director of the United States Patent and Trademark Office*